United States Patent Office 3,337,661
Patented Aug. 22, 1967

3,337,661
UPGRADED SILICEOUS COMPOSITION
Harvey D. Ferer, 101 S. 8th St., Omaha, Nebr. 68102, and Harold T. Stirling, 249 Roycroft Ave., Pittsburgh, Pa. 15234
No Drawing. Filed Apr. 8, 1964, Ser. No. 358,361
7 Claims. (Cl. 264—66)

This invention relates to a novel siliceous composition and to a method for producing such composition. More particularly, this invention relates to a process for altering the physical and chemical characteristics of a glass grinding effluent to produce a product having a wide variety of uses.

In the production of plate glass, sheets of glass are smoothed and polished by passing them beneath a series of grinding and polishing machines whereby one surface of the glass is treated. The sheets of glass are then turned over and passed through these machines a second time for treatment of the other side.

The grinding and polishing is accomplished by the use of an abrasive material which generally comprises a mixture of sand and water. During the grinding and polishing operations the surface of the glass is polished by the abrasive sand particles, and, simultaneously, the particles of sand become worn so that the relatively coarse sand initially used eventually becomes relatively fine. The sand is used over and over until it becomes too fine even for the final polishing step. While the sand particles are thus attrited, particles of glass are removed from the glass sheet and mixed with the sand.

When the abrasive particles become so fine that they cannot be used they are discharged as a waste effluent material which generally contains from 10 to 25% of glass debris and correspondingly 90 to 75% sand particles. The disposal of the waste glass grinding effluent is a continuing and costly problem to all plate glass manufacturers. The effluent is generated as a slurry at a surprisingly rapid rate and it is normally transported by the addition of sufficient water to enable the material to be pumped.

Generally the effluent slurry is pumped to a disposal area such as an abandoned mine until this area is filled at which time new dumps must be found. As the plate glass manufacturing industry has grown over the years and has used most of the available dumping areas, the problems and expense of removing this material has significantly increased. While the slurries are well suited to transport by pumping, they are generally difficult to contain after they are discharged.

An alternative to pumping the waste glass effluent as a slurry has been to extract the major portion of the water and then haul the dry or partially dry solids to a particular disposal site. Drying operations are both time consuming and costly and it is, of course, undesirable to carry out such operations on a waste product destined only for the dump.

Heretofore it has not been possible to utilize this finely divided waste material. Waste glass grinding effluent has an average particle size so small that nearly all of the material will pass through a 325 mesh Tyler screen, and because of its extremely small particle size, this material has not been suitable as a raw material for glass manufacture which requires that the raw material be in lump form. In addition, the waste sand mixture could not be used as a paint filler or as light weight aggregate or for other uses because the specific gravity of the mixture was higher than that which is acceptable for such uses.

A further drawback to the use of the waste glass grinding effluent was that this mixture of sand and glass contained impurities, a major portion of the impurities being the oxides of iron and aluminum. These impurities render the material unsuitable for uses such as for the light-weight aggregate referred to above, for the manufacture of glass, or as abrasives in cleaning preparations.

It has now been found that the above disadvantages can be eliminated and a product obtained which has a specific gravity sufficiently low for use as a filler for paint while concomitantly reducing the amount of undesirable impurities heretofore present.

The process of the invention makes possible the recovery of waste glass grinding effluent and the conversion thereof into a number of products which are useful for a wide variety of purposes in many industries. The conversion of the waste glass effluent is accomplished through a series of steps which must be carried out in the sequence and manner described hereinbelow.

In accordance with the invention, it is necessary to remove the iron content of the waste material by removing therefrom the iron particles and other magnetic contaminants. Removal of these impurities is absolutely necessary to produce an end product which will be pure white and which will not stain. Elimination of the magnetic contaminants can be accomplished by known methods, but it is preferred that the waste siliceous glass grinding effluent be treated by adjusting the water content of the slurry so that the water to solids ratio is approximately 4:1 and then agitating the solids in a tank to maintain them in suspension. This suspension is then passed through a ferro-filter of known type which removes the magnetic particles. In order to ensure the complete removal of the magnetic impurities, it may be necessary either to repeat this step, or, preferably, to mount a plurality of ferro-filters in series to enable continuous filtration until all or practically all of the magnetic particles have been removed.

Following the removal of the magnetic impurities it is necessary to eliminate non-magnetic fines which are also objectionable because of their undesirable particle size and their high percentage of impurities. This may be accomplished by allowing the solution, after discharge from the magnetic particle removal apparatus, to settle in a washing tank wherein it is washed at least once by mechanically agitating the liquid and then decanting the water which contains the non-magnetic fines having a diameter generally less than about 10 microns and other impurities.

The decantation step set forth above removes a major quantity of the water and impurities leaving behind relatively clean solids which are further treated by passing them through suitable apparatus such as a kiln, centrifuge, suction filter, air drier, or other equivalent apparatus to adjust the moisture content to approximately 10–23% and preferably about 17–20%. When the material has a water content within the given range it can readily be pelletized, and it is a feature of this invention that by maintaining the moisture content within the range set forth above the material can be pelletized without the use of a binder which would contaminate the final product.

The dewatered solids, having a predetermined moisture content as set forth above, should then be pelletized. For this purpose, the dewatered material is carried by suitable means to a feeder such as an automatic gravimetric feeder which will automatically control the desired weight of solids fed into the pelletizer. The pelletizer may be of any suitable type such as a drum, cone or disc pelletizer, an extruder or briquetter, or the like. The pelletizer should be adjusted however to produce pellets having diameters with a narrow size range within one-quarter inch and preferably within one-eighth inch such as $+\frac{1}{2}-\frac{5}{8}$ inch or $+\frac{3}{8}-\frac{1}{2}$ inch pellets. The uniformity of pellet size is important for successful processing as hereinafter described because it makes possible an even air flow and maintains an even temperature throughout the mass of pellets when treated in the manner set forth below.

The pellets are automatically sized as they are discharged from the pelletizer and they are carried by the conveyor to a pre-drying operation. During predrying, the pellets are subjected to a carefully controlled and steadily rising temperature between 200° and 600° F. for a period of from 2 to 7 minutes. Care must be taken that rate of rise in temperature is not excessive. If the temperature rise is too rapid during the predrying step the pellets may disintegrate due to internal pressures built up by the expanding water vapor.

After the waste glass grinding effluent pellets have been dried they are preheated by passing them to a zone of steadily rising temperature between about 1000° and 1500° F. The temperature chosen is inversely proportional to pellet size. Subsequent to such preheating, the pellets are fired at a temperature of between 2200° and 2800° F. by subjecting them to the intense heat which can be obtained by burning a highly combustible material. The firing should continue for a period between three and ten minutes to adequately treat the material.

The improvement in the properties of the waste glass grinding effluent is closely related to the firing step in the temperature range and for the period of time set forth above. If the treatment is not maintained within these ranges described above, then desired upgrading of the effluent material will not be obtained. Within the temperature range set forth above, it is preferred that a temperature between 2400° and 2750° F. be used. Within this range, the upgrading of the material is most pronounced.

After the firing step the material is crushed by suitable means to separate the individual pellets, allowed to cool, and then screened to remove any unfused or particulate material which may have accumulated. The material is then ground in a suitable apparatus such as a ball mill or other equivalent type of grinding equipment that is capable of reducing the pellets to a powder having a given size range.

Preferably, at least one stage of this grinding should be carried out in a ceramic lined ball mill using balls having a diameter between ½" and 3". The ratio of balls to pellets in the ball mill should approximately fill the voids between the balls, and the ball mill should be filled only to approximately 40% of total volume. In this manner the ball mill will operate at the highest efficiency in developing particles having the desired particle size. The grinding is completed when the particle size reaches the desired size for the end product which may range from 80 microns to 15 microns or less when the ground material is going to be used as a filler.

As a final step, the product may be air classified to obtain a product having a predetermined average particle size such as less than 15 microns. The air classification step is primarily necessary where the material is to be used as a paint filler, which use requires extremely small particles.

The invention is further illustrated with reference to the example set forth hereinbelow which describes in detail one embodiment of the invention. It is understood that the invention is not to be limited by the example but only with reference to the scope of the claims hereinafter set forth.

Example

To about 1000 pounds of waste glass grinding effluent in the form of a slurry there was added sufficient water to obtain a mixture having 25% solids. The mixture was constantly agitated and then passed twice through a ferrofilter wherein approximately 30 pounds of the material was removed because it contained a high percentage of iron-containing particles. The clean portion of the remaining slurry was dried to a moisture content of 20%, by heating it in a drier through which hot air was passed, and the dry material was fed by a gravimetric feeder into a cone pelletizer and there formed into pellets having diameters of between ⅜ and ½ inch. These relatively uniformly sized pellets were dried by initially subjecting them to a temperature of 300° F. and then gradually raising the temperature to 500° F. during a period of 4 minutes.

The dry material was then subjected to a preheating operation during which the temperature of the pellets were raised to 1350° F. The preheated material was then passed under a series of burners and fired at a temperature of about 2675° F. for a period of 6 minutes. After the material was fired, it was crushed and cooled. The cool fired pellets were screened to remove fines, and the pellets were charged into a 500 pound capacity ball mill containing 200 pounds of ceramic balls while being careful to maintain the charge of pellets in the mill at substantially 100 pounds. The ground material was subsequently classified in an air classifier. Seventy-five percent of the material obtained had a particle size of less than 15 microns. The remaining material was recycled for further treatment.

The product was tested and found to have an average specific gravity of 2.2. When the particles were mixed with other paint forming compounds there was developed a paint composition having excellent properties.

It has been found that the process set forth above, and primarily the step of firing the pellets within the given temperature range, results in the production of a siliceous product in which the specific gravity has been lowered from 2.6 or higher to as low as 2.0. In addition, the amount of impurities can be reduced by half or more. Thus there can be produced a product useful in many fields where such use has heretofore been impossible. For example, in the paint industry a large amount of filler is used. This filler must have a specific gravity of 2.5 or less to meet industry specifications. The waste glass grinding effluent has other excellent properties for use as a paint filler, however, the specific gravity has heretofore been too high. By virtue of the upgrading obtained by the instant process, the specific gravity of the waste material can be lowered to such a degree that the glass grinding effluent becomes an ideal paint filler having a specific gravity of less than 2.5.

Surprisingly, the reduced specific gravity does not lower the strength of the material, and therefore, the upgraded waste glass grinding effluent is also ideal for light-weight aggregates which can be used in concrete products, floor fill and the like. Such uses require a low specific gravity, a high strength, and low staining index. The upgrading process is particularly useful in these fields since it has all of these advantageous properties. A reduction in the staining index is provided by the removal of a major portion of the impurities. The material is of a lighter weight then heretofore obtainable because of the reduction in specific gravity, and the strength is maintained undiminished.

In addition to the uses for the product of this invention as set forth above, it can also be used as a replacement for $SiO_2$ in making glass in which case it is only crushed to a mean size of 30 microns, as a ceramic or plastic filler or fillers for undercoatings, insulators, pottery, sanitary fixtures, battery boxes, asphalt, fertilizers, and the like. The product is also useful as an abrasive especially in cleansers and as a sized pellet for use in blast furnaces and steel making vessels where the burden is low in $SiO_2$. The use of the product is especially useful in blast furnaces because beneficiated ores and other modern charges lack this important compound.

The heating step, which is of great importance in carrying out the process of this invention, can be carried out with any suitable conventional equipment such as a kiln or shaft furnace or a travelling grate or other suitable apparatus. The apparatus must, of course, be capable of withstanding the high temperatures involved, and accord-

We claim:

1. A process for upgrading waste siliceous aqueous glass grinding effluent to produce a useful and valuable material having a specific gravity of not more than 2.5, which comprises removing magnetic impurities and fines from said waste material; adjusting the moisture content of said waste material to between about 10–23%; then pelletizing the material to form pellets; drying said pellets at a temperature between 200° and 600° F.; preheating said pellets to a temperature between 1000° and 1500° F.; heating said pellets at a temperature between 2200° and 2800° F. for between 3 and 10 minutes; cooling the pellets; and grinding said pellets to a powder having a predetermined particle size.

2. A process for upgrading waste siliceous aqueous glass grinding effluent to produce a useful and valuable material having a specific gravity of not more than 2.5, which comprises removing magnetic impurities and fines from said waste material; adjusting the moisture content of said waste material to between 10 and 23%; pelletizing said waste material to form pellets having a predetermined substantially uniform diameter; drying said pellets at a temperature between 200° and 600° F.; preheating said pellets to a temperature between 1000° and 1500° F.; heating said pellets at a temperature between 2200° and 2800° F. for between 3 and 10 minutes whereby some fusion takes place between said pellets thereby forming a cake of material; crushing the cake of material to separate the individual pellets; allowing the pellets to cool; screening the pellets to remove any fines; grinding said pellets to a powder having a predetermined particle size; and air classifying said powder.

3. A process for upgrading waste siliceous aqueous glass grinding effluent to produce a useful and valuable material having a specific gravity of not more than 2.5, which comprises removing magnetic impurities and fines from said waste material; drying said waste material to between 10 and 23% moisture content; pelletizing said waste material to form pellets; drying said pellets by subjecting them to a slowly and steadily rising temperature between 200° and 600° F. for a period of 2 to 7 minutes; preheating said pellets by subjecting them to a steadily rising temperature between 1000° and 1500° F.; heating said pellets at a temperature between 2200° and 2800° F. for between 3 and 10 minutes, and cooling said pellets.

4. The process of claim 3 wherein said pellets are heated at a temperature between 2400° and 2750° F.

5. A process for upgrading waste siliceous aqueous glass grinding effluent which comprises removing magnetic impurities from said waste material; drying said waste material to between 10 and 23% moisture content; pelletizing said waste material to form pellets having a predetermined substantially uniform diameter; drying said pellets by subjecting them to a slowly rising temperature between about 200° and 600° F.; preheating said pellets by heating them to a temperature between about 1000 and 1500° F; heating said pellets at a temperature between 2200° and 2800° F. for between 3 and 10 minutes; cooling the pellets; grinding said pellets to a powder and air classifying said power to obtain a siliceous product having a specific gravity of not more than 2.5.

6. A process for upgrading waste siliceous aqueous glass grinding effluent to produce a useful and valuable material having a specific gravity of not more than 2.5, which comprises removing magnetic impurities and fines from said waste material; drying said waste material to between 10 and 23% moisture content; pelletizing said waste material in the absence of any binder other than the water already present to form pellets having a predetermined substantially uniform diameter; drying said pellets by subjecting them to a slowly and steadily rising temperature between 200° and 600° F. for a period of 2 to 7 minutes; preheating said pellets by subjecting them to a steadily rising temperature between 1000° and 1500° F.; heating said pellets at a temperature between 2200° and 2800° F. for between 3 and 10 minutes whereby some fusion takes place between said pellets thereby forming a cake of material; crushing the cake of material to separate the individual pellets; allowing the pellets to cool; screening the pellets to remove any fines; grinding said pellets to a powder and air classifying said power to obtain a siliceous product having an average particle size less than 15 microns and a specific gravity of not more than 2.5.

7. The process of claim 6 wherein said pellets are heated at a temperature of between about 2400° and 2750° F.

References Cited

UNITED STATES PATENTS 2,182,384  12/1939  McGregor ---------- 106—288

TOBIAS E. LEVOW, *Primary Examiner.*

HELEN M. McCARTHY, *Examiner.*

J. POER, *Assistant Examiner.*